United States Patent
Chen et al.

(10) Patent No.: US 8,027,550 B2
(45) Date of Patent: Sep. 27, 2011

(54) IMAGE-DOCUMENT RETRIEVING APPARATUS, METHOD OF RETRIEVING IMAGE DOCUMENT, PROGRAM, AND RECORDING MEDIUM

(75) Inventors: Mang Chen, Shanghai (CN); Bo Wu, Shanghai (CN); Yadong Wu, Shanghai (CN); Chen Xu, Shanghai (CN)

(73) Assignee: Sharp Kabushiki Kaisha, Osaka (JP)

( * ) Notice: Subject to any disclaimer, the term of this patent is extended or adjusted under 35 U.S.C. 154(b) by 970 days.

(21) Appl. No.: 11/998,793

(22) Filed: Nov. 30, 2007

(65) Prior Publication Data
US 2008/0240618 A1 Oct. 2, 2008

(30) Foreign Application Priority Data

Mar. 30, 2007 (CN) .......................... 2007 1 0090670

(51) Int. Cl.
*G06K 9/54* (2006.01)
*G06F 17/00* (2006.01)
(52) U.S. Cl. .................. 382/305; 715/243; 715/247
(58) Field of Classification Search .................. 382/305; 715/243, 247
See application file for complete search history.

(56) References Cited

U.S. PATENT DOCUMENTS

| | | |
|---|---|---|
| 5,680,478 A | 10/1997 | Wang et al. |
| 5,680,479 A | 10/1997 | Wang et al. |
| 6,081,616 A | 6/2000 | Vaezi et al. |
| 6,115,497 A | 9/2000 | Vaezi et al. |
| 2001/0004739 A1 | 6/2001 | Sekiguchi et al. |
| 2001/0031103 A1 | 10/2001 | Kim et al. |
| 2002/0122587 A1 | 9/2002 | Lim et al. |
| 2003/0126125 A1 | 7/2003 | Kim et al. |
| 2005/0193327 A1* | 9/2005 | Chao et al. .................. 715/513 |
| 2006/0182347 A1 | 8/2006 | Kim et al. |
| 2007/0030519 A1 | 2/2007 | Tojo |
| 2007/0081179 A1* | 4/2007 | Nishida .................. 358/1.11 |

FOREIGN PATENT DOCUMENTS

CN 1570969 A 1/2005
(Continued)

OTHER PUBLICATIONS

Bruel, T. "High Performance Document Layout Analysis" in Symposium on Document Image Understanding Technology, Greenbelt, MD, 2003.*

*Primary Examiner* — Vu Le
*Assistant Examiner* — Soo Park
(74) *Attorney, Agent, or Firm* — Edwards Angell Palmer & Dodge LLP; David G. Conlin; David A. Tucker

(57) ABSTRACT

Feature vectors used in discrimination of images include information on feature blocks of images in an image-document retrieving apparatus of the present invention. Text areas of a page image document are combined to form rectangular images. On the basis of information on the rectangular images that are extracted, a geometric structure of the page is analyzed, the page image document is divided into plural blocks, and then a plurality of feature blocks describing features of the page document image are selected from the plural blocks. The feature vectors are constituted of information on the feature blocks thus selected. This makes it possible to provide an image-document retrieving apparatus and a method of retrieving image documents, by which retrieval of image documents containing mainly text and a graphic is improvable in accuracy.

8 Claims, 12 Drawing Sheets

FOREIGN PATENT DOCUMENTS

| | | |
|---|---|---|
| CN | 1570972 A | 1/2005 |
| CN | 1570973 A | 1/2005 |
| CN | 1851713 A | 10/2006 |
| JP | 05-342325 A | 12/1993 |
| JP | 06-068301 A | 3/1994 |
| JP | 06-251193 | 9/1994 |
| JP | 07-168910 | 7/1995 |
| JP | 2007-047943 A | 2/2007 |
| JP | 2007-048057 A | 2/2007 |

* cited by examiner

FIG. 4

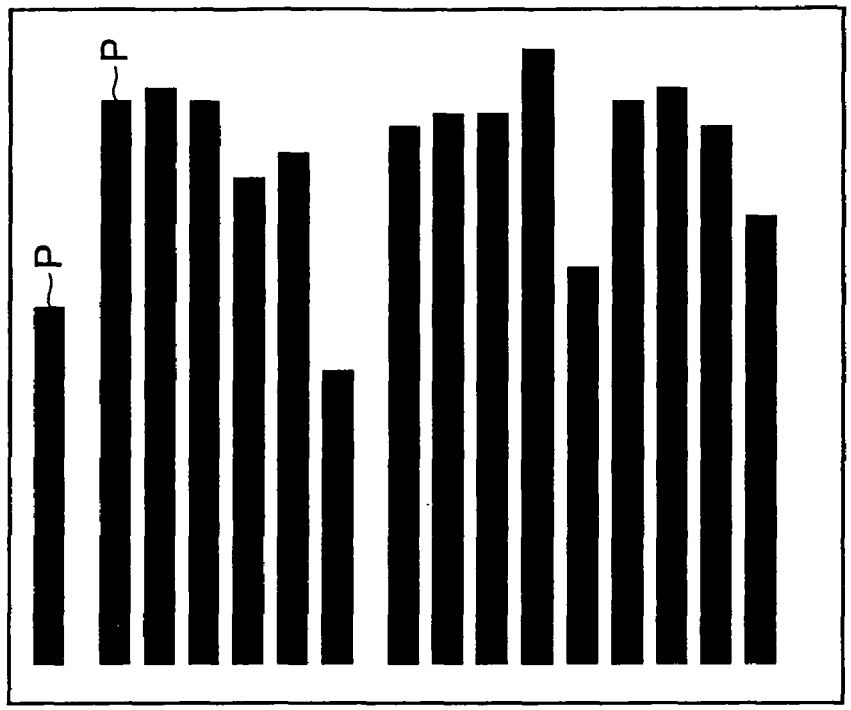

1. Electromagnetic spectrum

The electromagnetic spectrum is the range of all possible electromagnetic radiation. Also, the "electromagnetic spectrum" (usually just spectrum) of an object is the range of electromagnetic radiation that it emits, reflects, or transmits.

The electromagnetic spectrum, shown in the table, extends from frequencies used in the electric power grid (at the long-wavelength end) to gamma radiation (at the short-wavelength end), covering wavelengths from thousands of kilometres down to fractions of the size of an atom. It is commonly said that EM waves beyond these limits are uncommon, although this is not actually true.

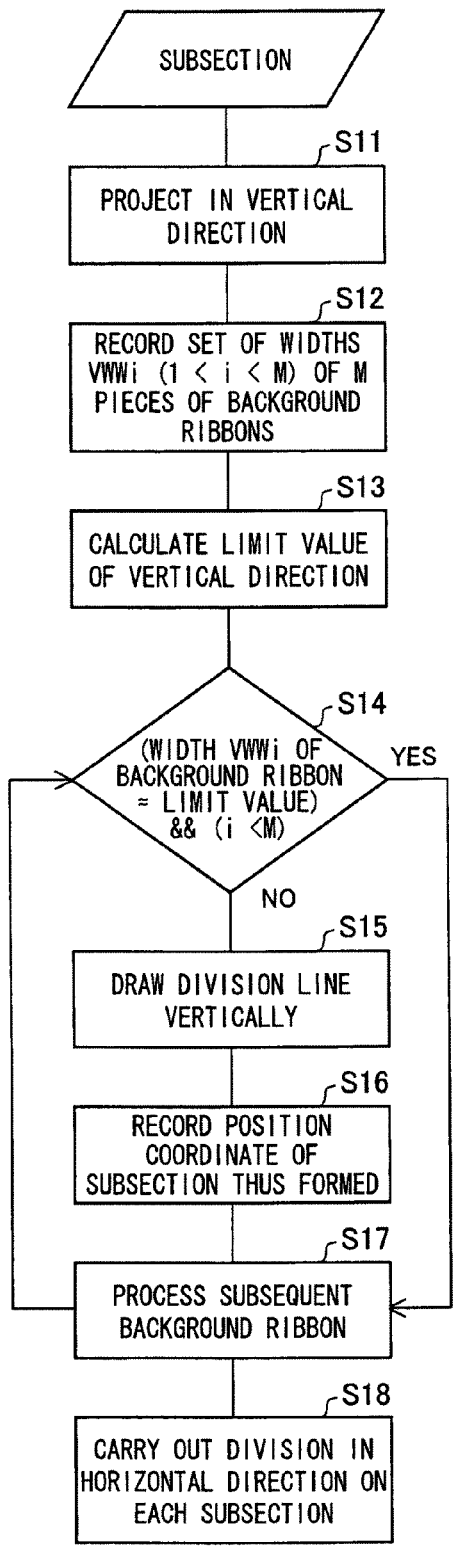
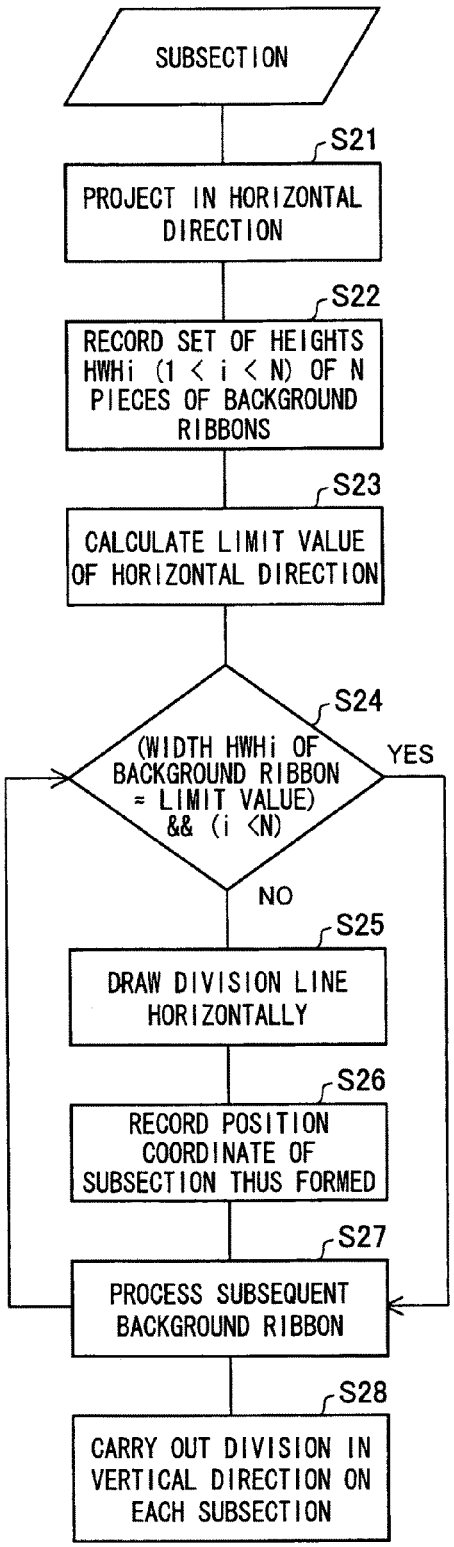
FIG. 5 (a)
FIG. 5 (b)

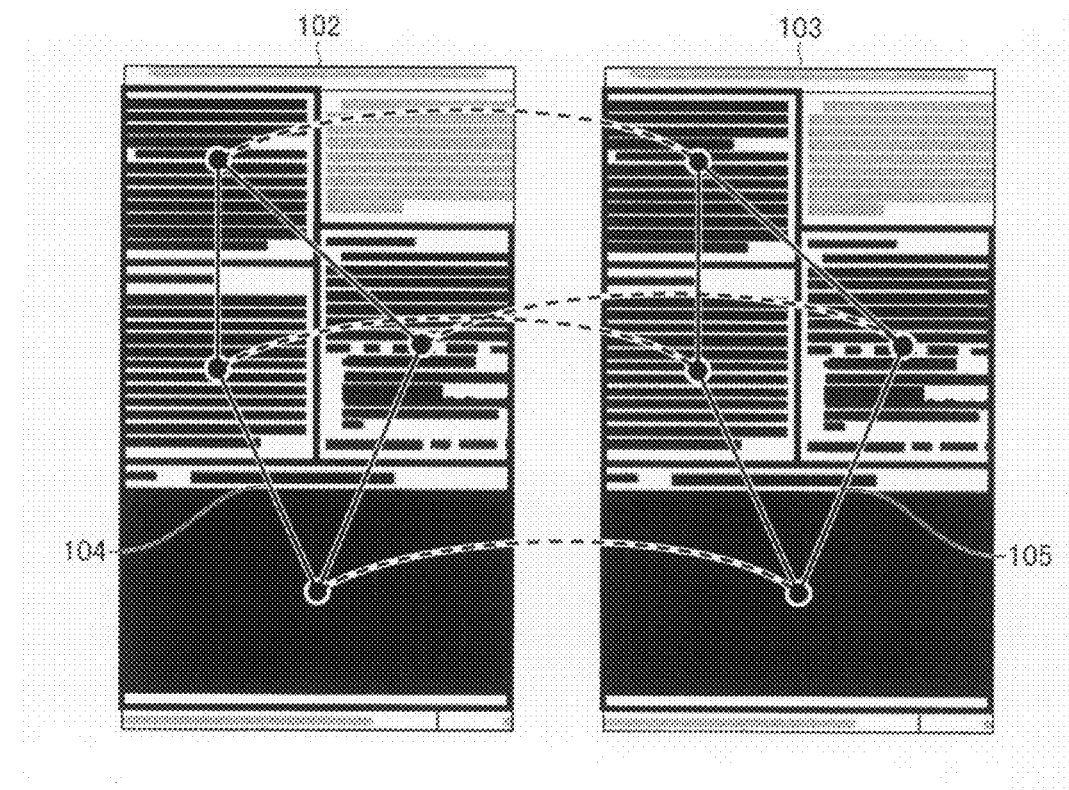

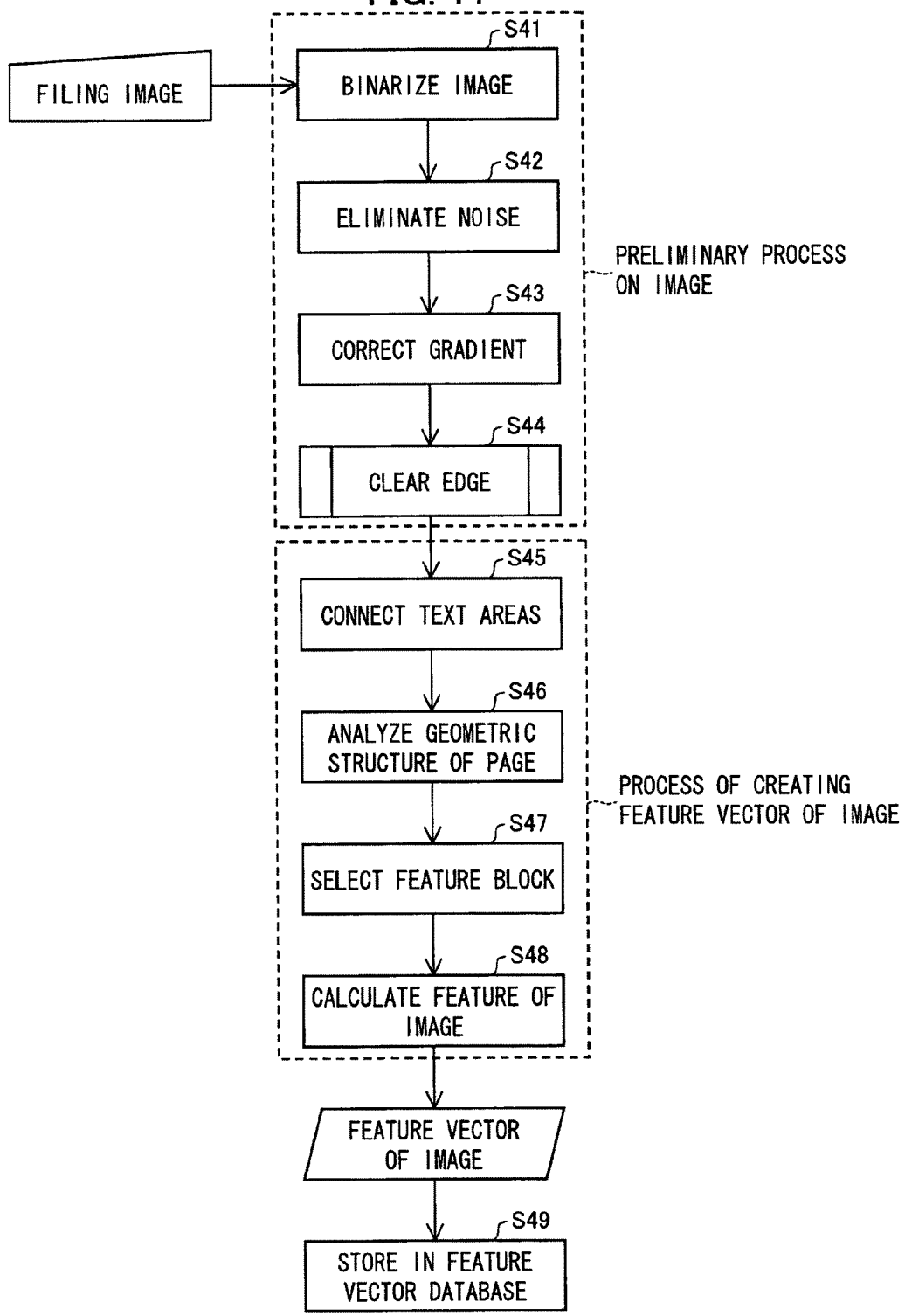

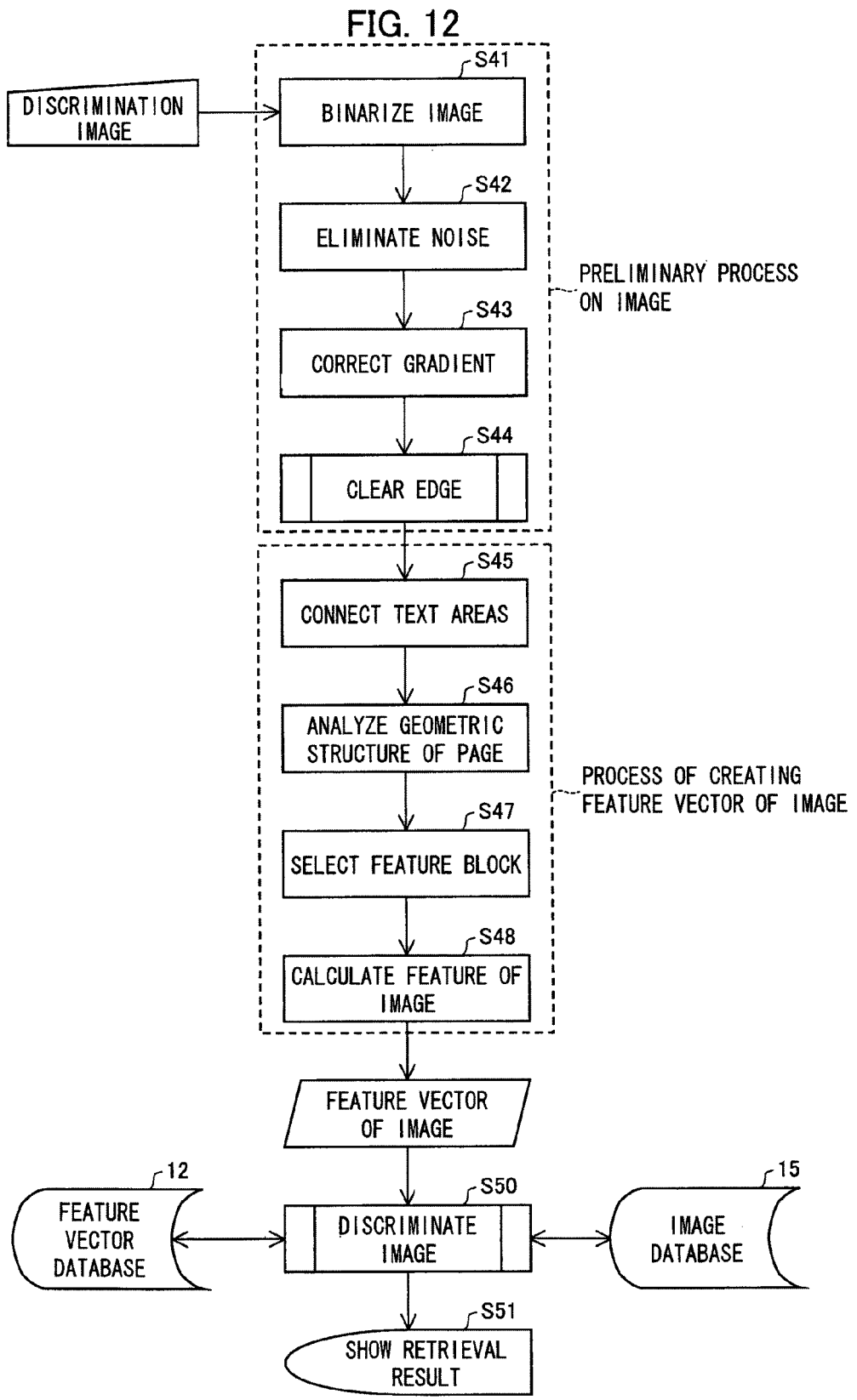

IMAGE-DOCUMENT RETRIEVING APPARATUS, METHOD OF RETRIEVING IMAGE DOCUMENT, PROGRAM, AND RECORDING MEDIUM

This Nonprovisional application claims priority under 35 U.S.C. §119(a) on Patent Application No. 200710090670.7 filed in China on Mar. 30, 2007, the entire contents of which are hereby incorporated by reference.

FIELD OF THE INVENTION

The present invention relates to an image-document retrieving apparatus and a retrieval method, by which an image document containing mainly text and a graphic is retrieved by use of features of the image.

BACKGROUND OF THE INVENTION

Image filing systems by which documents are converted into images with image input apparatuses, such as image scanners, and electrically stored to allow the documents to be retrieved afterwards have come to practical use. To retrieve the documents scanned in the form of images, techniques for retrieving images can be utilized.

Conventional image retrieval techniques include retrieval based on text given to images and retrieval based on visual content of images.

Retrieval based on text given to images is carried out as follows. Text information explaining the images are created as information that is to be associated with the images. The images are retrieved by use of the text information as keywords. Conventional techniques of this retrieval are described in Publications 1 and 2, for example.

It is, however, currently impossible to automatically give text to images by computer visions and artificial intelligence technologies, although they have been developed every day. Thus, the text needs to be given manually for the retrieval based on text, which requires bothersome work.

Moreover, since the text is given manually, there is a chance of including subjective points of view of human being. Thus, the text given may differ in meaning. Further, there is no established rule as to how the text is to be given to the images. Thus, interpretation of keywords may vary to some extent. Therefore, an image that is obtained as a result of the retrieval may not always be the image targeted by the user, which affects the accuracy of the retrieval.

Further, the image retrieval based on text does not utilize visual features (e.g. colors, patterns) of images. Thus, it cannot be said that sufficient information on the images is presented.

On the other hand, the retrieval based on visual content of images is carried out as follows. An image is retrieved on the basis of features of the image. Since the image is retrieved by use of images, no manual input of text is necessary. Thus, no bothersome work is necessary. Further, there is no chance of including subjective points of view of human being.

The following three are generally-used features of images: color feature, pattern feature, and shape feature.

The color feature is an overall attribute of an image. Surface characteristics of the image are described by use of information on colors of the image. Conventional techniques thereof are described in Publications 3 and 4, for example.

The pattern feature reflects features of local structures of the image, and describes surface characteristics of the image. Local statistical calculation needs to be carried out in sections containing plural pixel points. Conventional techniques thereof are described in Publications 5 and 6, for example.

Regarding the shape feature, division of an image and recognition of a section are carried out on a particular section of the image, and then the shape feature is extracted. Conventional techniques thereof are described in Publications 7 and 8, for example.

Publication 1: Specification of Chinese Patent Application Publication No. 1851713 "Multi-image-text based image search and display method"

Publication 2: Specification of Chinese Patent Application Publication No. 1402853 "Image retrieval system and image retrieval method"

Publication 3: Specification of Chinese Patent Application Publication No. 1365067 "Image retrieval method based on color and image characteristic combination"

Publication 4: Specification of Chinese Patent Application Publication No. 1426002 "Image research method and device not affected by light change"

Publication 5: Specification of Chinese Patent Application Publication No. 1570972 "An image retrieval method based on image grain characteristic"

Publication 6: Specification of Chinese Patent Application Publication No. 1342300 "Texture description method and texture-based image retrieval method using Gabor filter in frequency domain"

Publication 7: Specification of Chinese Patent Application Publication No. 1570969 "An image retrieval method based on marked interest point"

Publication 8: Specification of Chinese Patent Application Publication No. 1570973 "An image retrieval method using marked edge"

However, the conventional retrievals based on visual content of images have the following problems.

The images are always affected by noise, which results in deformation and distortion of the images. In the retrieval methods using patterns and colors as the features of the image, ideal retrieval results are not obtainable if deformation or distortion occurs.

Further, colors are not responsive to changes in direction or size of the sections of the image. Thus, the local features cannot be captured properly by use of the color features.

Especially Publication 4 considers impacts of lighting on color information at the time of forming the image. In Publication 4, low luminance and its own luminance are eliminated, and the remaining pixels are converted into colors under a standard luminance space. However, the determined standard value of the low luminance, the way to determine the value of the low luminance, and selection of the limit value of its own luminance directly affect the subsequent processes on the image, and therefore give a significant impact on the results of the retrieval.

Further, it is simply impossible in the retrieval method using pattern features to obtain high-level image content. Furthermore, if the image changes in resolution, a significant deviation may occur in the pattern obtained by calculation using it. Moreover, if the image is affected by application of light or condition of reflection, false patterns may be formed, which gives wrong ideas.

On the other hand, the retrieval based on the shape feature of the image is not so effective for images having vague outlines. Normally, information on a target shape that the extracted shape feature reflects is not exactly identical to human intuitive perception. Therefore, it is not easy to establish a perfect mathematical model. Thus, it is difficult to determine the features, and much calculation time and memory are required. Further, changes in shape of the image causes a significant decrease in accuracy.

Especially Publication 8 is applied to images having sharp edges. Thus, it is easy to capture the edges of the image of the image document containing mainly text and a graphic, which document is what the present invention focuses on. However, it is difficult to define the edges in such a way as to describe the full image.

SUMMARY OF THE INVENTION

The present invention has as an object to provide an image-document retrieving apparatus and an image-document retrieval method, by which accuracy of retrieval of image documents is improvable.

To attain the above object, an image-document retrieving apparatus of the present invention that retrieves an image document containing mainly text and a graphic is adapted so that the image-document retrieving apparatus includes: a feature vector creating section that creates a feature vector of a page image document; and an image document discrimination section that compares the feature vector, created by the feature vector creating section, of the page image document that is an object of discrimination, with the feature vector, created by the feature vector creating section, of the page image document that is accumulated as an object of retrieval, and extracts, from the page image documents that are objects of retrieval, a page image document that corresponds to the page image document that is the object of discrimination. The feature vector creating section includes: a rectangular image extracting section that combines text areas of the page image document to extract a rectangular image; a block-division section that analyzes, on the basis of information on the rectangular image extracted by the rectangular image extracting section, a geometric structure of a page to divide the page image document into plural blocks; a feature block selecting section that selects, among the plural blocks divided by the block-division section, plural feature blocks that describes a feature of the page image document; and a feature calculating section that determines, as the feature of the page image document, information on the plural feature blocks selected by the feature block selecting section. The feature vector creating section incorporates, as an element into the feature vector of the page image document, a result of determination carried out by the feature calculating section. Note that the page image document is an image document that is read out on a page-by-page basis and is constituted of one page.

With this structure, the color feature (black pixel or white pixel), the spatial-relation feature (distance between adjacent black pixels), and the feature of the target are used comprehensively in the sections such as the rectangular image extracting section and the block-division section. Accordingly, plural types of feature information on the image are used so that it becomes possible to avoid the loss of information on the image resulting from the use of a single feature. Further, the content of the image is described sufficiently so that it becomes possible to effectively improve the accuracy of the image retrieval.

Further, using the method of analyzing the geometric structure of the page to define the feature block that describes the feature of the image document, the block-division section image divides the page image document into geometric blocks each of which is relatively uniform in space between lines of the document, whereby the accuracy of retrieval is kept high even if an image document that differs in color density and resolution or contains a combination of different languages is the subject of retrieval.

Further, not all of the blocks divided by the block-division section are used, but a feature block that describes the feature of the page image document is selected by the feature block selecting section in order to use the feature block to describe the feature of the page image document. This makes it possible to eliminate elements that influence accuracy of the retrieval, such as blocks with little content, and therefore improve accuracy of the retrieval.

The feature calculating section determines, as the feature of the page image document, information on the plural feature blocks thus selected, and incorporates the feature, as an element, into the feature vector of the page image document. Therefore, main features of the image are aggregated into the feature vector of the image document. Thus, it is possible to describe more overall content of the image document. This further improves the accuracy of the retrieval of the image document. Further, the feature vector defined by aggregating the information on the respective feature blocks is simpler and more intuitive than those defined by conventional ways of extracting the features, and allows reduction in amount of calculation.

Further, the information on plural feature blocks is incorporated in the feature vector of the page image document. Thus, the feature blocks are compared with one another during the process in which the image document discrimination section compares the feature vectors to find out if the discrimination image matches the page image document that is subject to retrieval. Thus, it is possible to avoid retrieval errors such as failure of matching due to deviation of information in a local area of the image, and therefore to reduce retrieval errors.

The foregoing produces an advantage that an image-document retrieving apparatus is provided by which accuracy of image document retrieval is improvable.

To attain the above object, a method of retrieving an image document containing mainly text and a graphic in accordance with the present invention is adapted so that the method includes: a feature-vector creating step of creating a feature vector of a page image document; and an image-document discriminating step of comparing the feature vector, created in the feature-vector creating step, of the page image document that is an object of discrimination, with the feature vector, created in the feature-vector creating step, of the page image document that is accumulated as an object of retrieval, and extracting, from the page image documents that are objects of retrieval, a page image document that corresponds to the page image document that is the object of discrimination. The feature-vector creating step includes: a rectangular image extracting step of combining text areas of the page image document to extract a rectangular image; a block-division step of analyzing, on the basis of information on the rectangular image extracted in the rectangular image extracting step, a geometric structure of a page, and dividing the page image document into plural blocks; a feature-block selecting step of selecting, among the plural blocks divided in the block-division step, plural feature blocks on the basis of a predetermined condition; and a feature-calculating step of determining, as a feature of the page image document, information on the plural feature blocks selected in the feature block selecting step. The feature-vector creating step incorporates, as an element into the feature vector of the page image document, a result of determination carried out in the feature calculating step.

This makes it possible to provide a method of retrieving an image document, by which method accuracy of retrieval of image documents is improvable, as already discussed in the description of the retrieving apparatus of the present invention. This is an advantage.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 4 is an illustration showing a process carried out by a rectangular image extracting section in the image-document retrieving apparatus.

FIGS. 5(a) and 5(b) are flowcharts each showing a process carried out by a block-division section in the image-document retrieving apparatus.

FIG. 10 is an illustration showing a process carried out in S32 of the flowchart shown in FIG. 9.

FIG. 11 is a flowchart showing a process of accumulating feature vectors to create feature vectors of filing images and accumulate the feature vectors in a feature vector database.

FIG. 12 is a flowchart showing a retrieval process by which feature vectors of discrimination images are created and compared with the feature vectors accumulated in the feature vector database to retrieve a target image.

DESCRIPTION OF THE EMBODIMENTS

The present invention relates to retrieval of image documents that are images mainly containing text and a graphic. The present invention is applicable to, for example, image filing systems by which documents are converted into images by image input apparatuses, such as image scanners, to be stored electrically so that the documents can be retrieved at a later time. Further, using an image-document retrieval system as an independent system, the present invention is applicable to the fields of security of network information and protection of intellectual properties. Further, it is also possible to incorporate the present invention into MFP and image forming apparatuses to retrieve a target image.

According to the present invention, an image document that is an image containing mainly text and a graphic is retrieved by use of features of the image. Differing from conventional image retrieval methods, the present invention is based on a standpoint that features of an image document are well described in subsections where information such as text, pictures, and tables is relatively concentrated within the image. Thus, feature blocks describing the features are defined to allow retrieval using the feature blocks.

Specifically, a preliminary process including binarization is carried out on the image. Then, a one-page image is analyzed in its geometric structure and divided into subsections. Thereafter, subsections that describe the features of the image are defined as feature blocks. Then, the features of the blocks of the image are determined in the feature blocks to create feature vectors of the image. The image document is retrieved by use of the feature vectors. Hereinafter, the image document will be simply referred to as an image, unless it is preferable to clearly indicate that the image is the image document containing mainly text and a graphic.

It is possible to adapt the present invention for use as an independent image-document retrieval system, for example. The present invention is applicable to the fields of security of network information and protection of intellectual properties. It is also possible to incorporate the present invention into MFP, image forming apparatuses, and printers for retrieval of target images.

The following describes an embodiment of the present invention, with reference to FIGS. 1 to 12. The present embodiment is on the assumption that the present invention is installed in MFP or the like to function as an image filing system. Accordingly, the present embodiment discusses an exemplary structure in which filing-target images are accumulated to form a database, and, concurrently with accumulating the images, the feature vectors of the image are also accumulated to form a database. The present invention, however, is not to be limited to the foregoing description.

Figure 1:
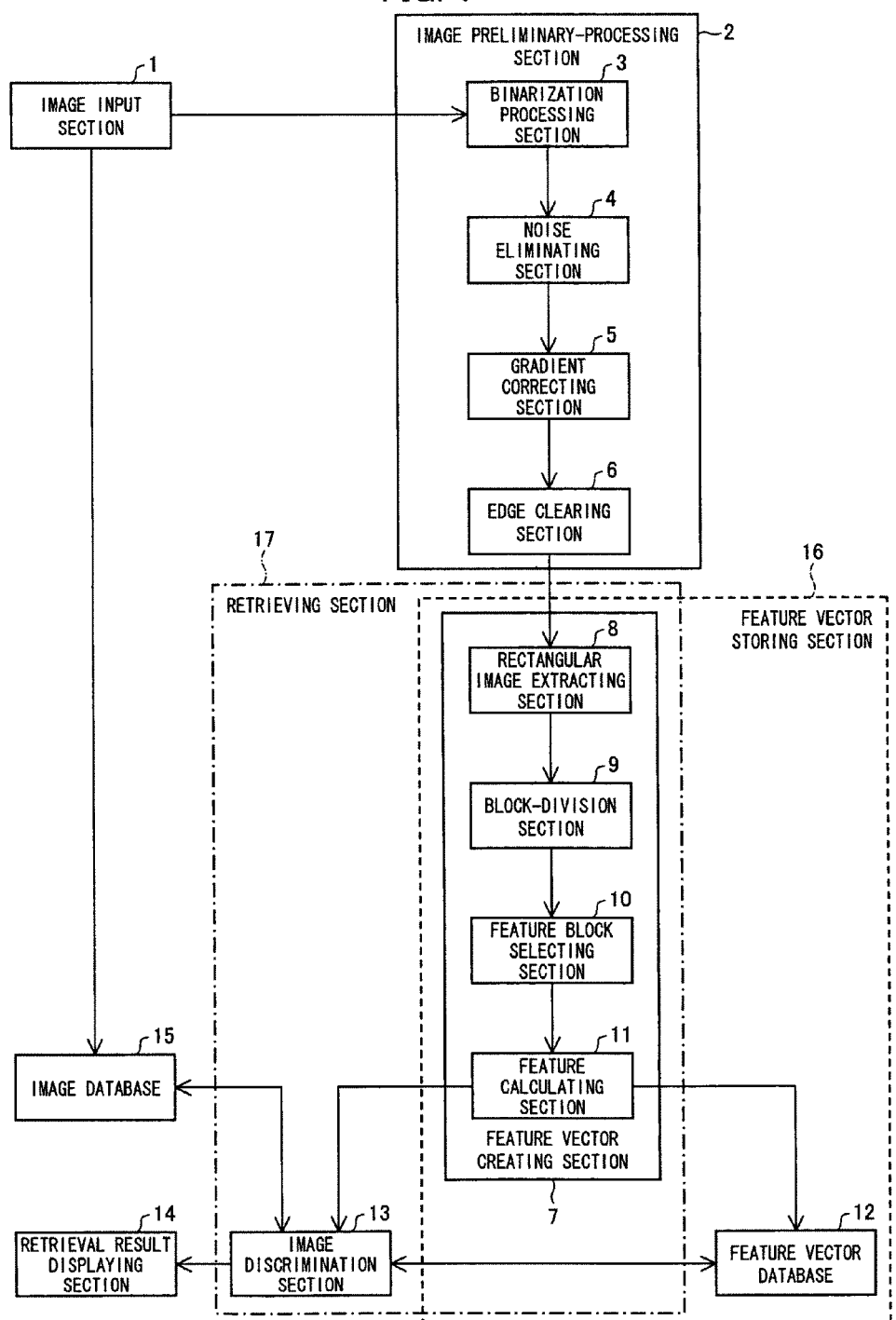
FIG. 1 is a block diagram showing a structure of a main part of an image-document retrieving apparatus, illustrating an embodiment of the present invention.

FIG. 1 is a block diagram showing functions of an image-document retrieving apparatus, illustrating an embodiment of the present invention.

As shown in FIG. 1, the image-document retrieving apparatus of the present embodiment includes an image input section 1, an image preliminary-processing section 2, a feature vector creating section 7, a feature vector database 12, an image discrimination section 13, a retrieval result displaying section 14, and an image database 15.

The image input section 1 obtains images. An exemplary image input section 1 is an image scanner. The way to obtain the images, however, is not limited to the use of image scanners, and the images may be obtained by use of communication interface by which images are obtained via networks or the like. It is also possible to obtain images by use of interface by which images taken with a digital image-taking apparatus such as digital cameras are input.

Images that are targeted to be filed (accumulated) (the images will be referred to as filing images hereinafter) and images that serve as key images in retrieval of target images (hereinafter, discrimination image) are all input via the image input section 1.

The filing image and discrimination image, both of which are input via the image input section 1, are transmitted to the image preliminary-processing section 2. The filing image is also transmitted to the image database 15 (image accumulating section). The image database 15 accumulates the images transmitted from the image input section 1. The image database 15 constitutes an image document accumulating section of the present invention.

The image preliminary-processing section 2 carries out a preliminary process on the filing image and the discrimination image, both of which are transmitted from the image input section 1. The image preliminary-processing section 2 includes a binarization processing section 3, which changes an image into a binarized image of black and white, a noise eliminating section 4, which eliminates noise contained in image data, a gradient correcting section 5, which corrects a gradient of images, and an edge clearing section 6, which clears shadow appeared at the time of reading out the image.

Figure 2:
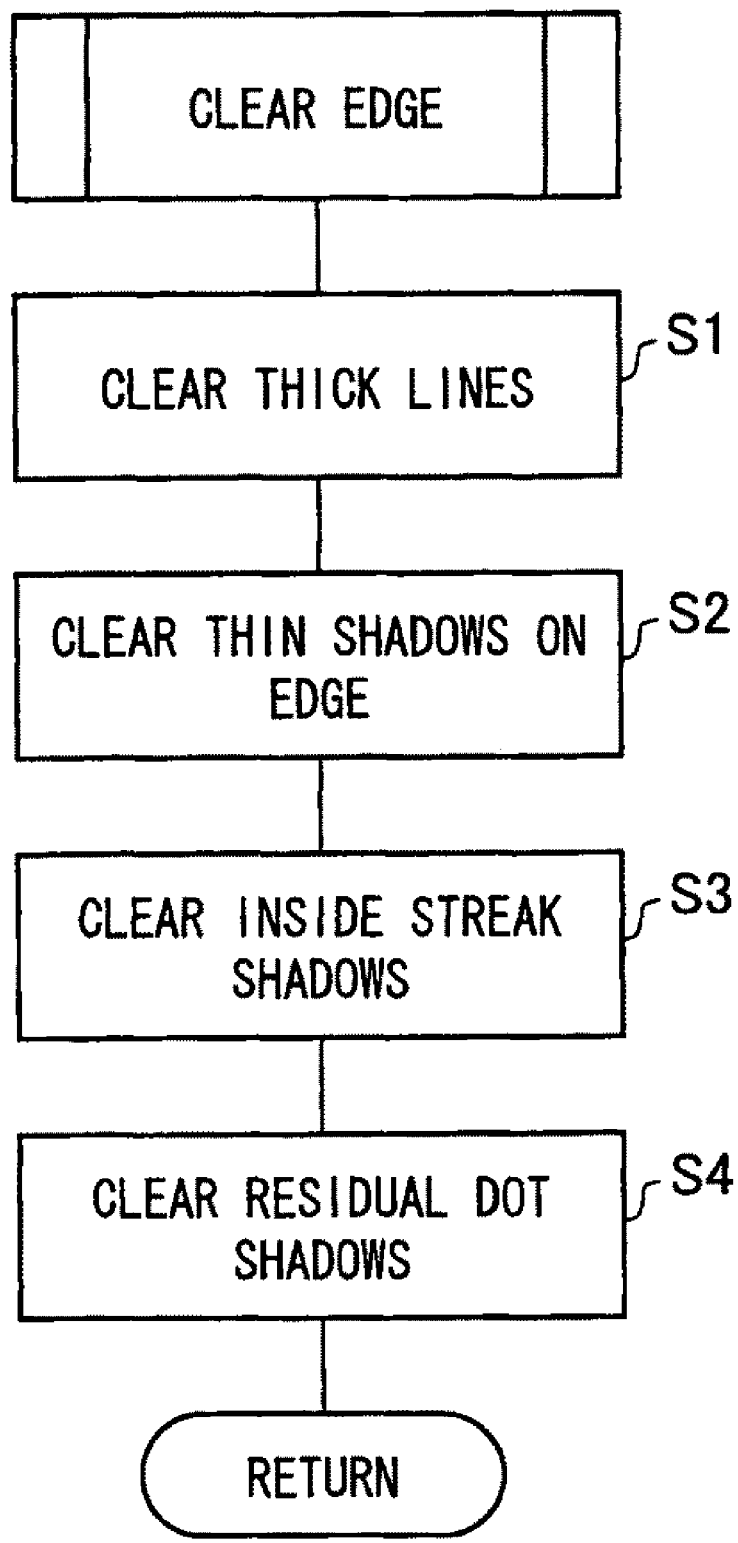
FIG. 2 is a flowchart showing a process carried out by an edge clearing section in the image-document retrieving apparatus.
Figure 3:
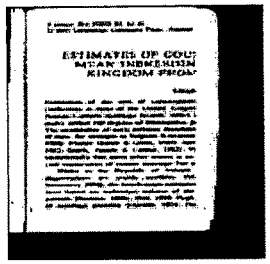
FIGS. 3(a) to 3(e) are illustrations each showing a result of the process carried out by the edge clearing section in the image-document retrieving apparatus.
Figure 3:
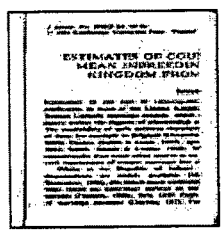
Figure 3:
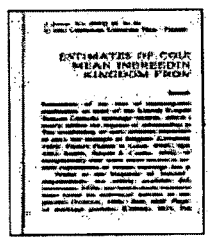
Figure 3:
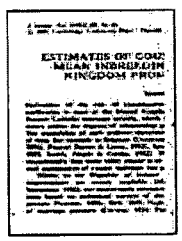
Figure 3:
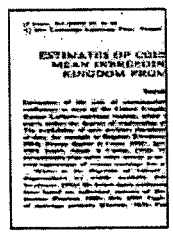

FIG. 2 shows the process of clearing the edges in the edge clearing section 6. FIGS. 3(*a*) to 3(*e*) each show results of the respective steps of FIG. 2.

Shadows sometimes appear around peripheral sections of images, mainly in a case of duplicate images. The edge clearing section 6 clears the shadows. First, thick lines of the images are cleared (S1). As a result, the thick frame around the original image in FIG. 3(*a*) is cleared as shown in FIG. 3(*b*). Then, thin shadows of edges (periphery) are cleared (S2). As a result, the thin shadows on the periphery in FIG. 3(*b*) are cleared as shown in FIG. 3(*c*). Then, streak shadows on the image are cleared (S3). As a result, the streak shadows on the image in FIG. 3(*c*) are cleared as shown in FIG. 3(*d*). Lastly, residual dot shadows are cleared (S4). As a result, the dot shadows in FIG. 3(*d*) are cleared as shown in FIG. 3(*e*).

If shadows appear on the peripheral sections of the image, and if the features of the image include the shadows, accurate retrieval is less likely to be achieved when the features of the image are used in the retrieval. Clearing the shadows from the page image document by the edge clearing section makes it possible to increase the range of processing so that application to MFP, copying machines and the like becomes possible.

After having undergone the preliminary process in the preliminary-processing section 2, the filing image and the discrimination image are transmitted to the feature vector creating section 7.

The feature vector creating section 7 creates feature vectors of the respective images. The feature vector creating section 7 includes a rectangular image extracting section 8, a block-division section 9, a feature block selecting section 10, and a feature calculating section 11.

After having been transmitted to the feature vector creating section 7, the filing image and the discrimination image are first fed into the rectangular image extracting section 8. Using a color feature and a spatial-relation feature, the rectangular image extracting section 8 combines text areas of the image to extract rectangular images. The color feature is either a black pixel or a white pixel. The spatial-relation feature is a distance between two adjacent black pixels.

Plural types of feature information of the image are used so that loss of information on the image owing to use of a single feature becomes avoidable. Further, the content of the image is described sufficiently so that it becomes possible to effectively improve accuracy of the retrieval of the image.

If the distance between two adjacent black pixels is shorter than a predetermined threshold distance, the rectangular image extracting section 8 changes all pixels in between the adjacent pixels, that is to say all white pixels in between the adjacent pixels, into black pixels. This is repeated so that nearby text areas of the image are combined to form rectangular images P as shown in FIG. 4. FIG. 4 shows a case of a horizontal writing. In this case, plural rectangular images P corresponding to the rows are formed. In a case of a vertical writing, on the other hand, rectangular images P corresponding to the columns are formed.

After having been converted into the images each constituted of the rectangular images P in the rectangular image extracting section 8, the filing image and the discrimination image are transmitted to the block-division section 9.

On the basis of the information on the rectangular images P, the block-division section 9 analyzes an overall geometric structure of one-page image of the filing image constituted of the rectangular images P and that of the discrimination image constituted of the rectangular images P, and divides each of the filing image and the discrimination image into plural blocks.

The information on the rectangular images P includes position coordinates, heights, and widths of the rectangular images P. The height is a distance in a vertical direction. The width is a distance in a horizontal direction. A width VWW and a height HWH of a background ribbon (background area) W, which is an aggregation of the white pixels between the respective rectangular images P, are calculable on the basis of the information on the rectangular images P. The width VWW of the background ribbon W is the distance in the horizontal direction between background ribbons W that are adjacent in the horizontal direction. The height HWH of the background ribbon W is the distance in the vertical direction between background ribbons W that are adjacent in the vertical direction.

Using the width VWW and the height HWH of the background ribbon W, the block-division section 9 divides one-page image into plural blocks in such a manner that each block contains background ribbons W of the same width VWW and the same height HWH.

FIG. 5(*a*) shows a flow in the block-division process carried out by the block-division section 6 to divide the image in the vertical direction. FIG. 5(*b*) shows a flow in the block-division process carried out by the block-division section 6 to divide the image in the horizontal direction. The flow shown in FIG. 5(*a*) is followed to divide the image in the vertical direction. The flow shown in FIG. 5(*b*) is followed to divide the image in the horizontal direction.

The following describes the flow shown in FIG. 5(*a*). A projection pattern in the vertical direction is determined on the basis of the information on the image constituted of the rectangular images P (S11). Then, the widths VWW of M pieces of background ribbons W are recorded as a set (S12). Thereafter, a limit value in the vertical direction is determined (S13). The limit value is determined as follows. First, the number of different widths VWW of the background ribbons W in the set is determined. Then, a width VWW that most of the background ribbons W have is defined as the limit value.

Then, each of the widths VWW of the background ribbons W in the set is compared with the limit value (S14). If the width VWW is similar to the limit value, then the flow continues to S17 to process the subsequent background ribbon W and then returns to S14. If the width VWW and the limit value in S14 are dissimilar, a division line is drawn vertically (S15). Then, position coordinates of subsections thus formed are recorded (S16). Thereafter, the flow continues to S17 to process the subsequent background ribbon W and then returns to S14.

After the process of S14 to S17 has been carried out on all of the M pieces of background ribbons W included in the set, the flow of division in the horizontal direction as shown in FIG. 5(*b*) is used with respect to each of the subsections recorded in S16 (S18).

The following describes the flow of division in the vertical direction, with reference to FIG. 5(*b*). A projection pattern in the horizontal direction is determined on the basis of the information on the image constituted of the rectangular images P (S21). Then, the heights HWH of N pieces of background ribbons W are recorded as a set (S22). Thereafter, a limit value in the horizontal direction is determined (S23). The limit value is determined as follows. First, the number of different heights HWH of the background ribbons W in the set is determined. Then, a height HWH that most of the background ribbons W have is defined as the limit value.

Then, each of the heights HWH of the background ribbons W in the set is compared with the limit value (S24). If the height HWH is similar to the limit value, then the flow continues to S27 to process the subsequent background ribbon W and then returns to S24. If the height HWH and the limit value are dissimilar in S24, then a division line is drawn horizontally (S25). Then, position coordinates of subsections thus formed are recorded (S26). Thereafter, the flow continues to S27 to process the subsequent background ribbon W and then returns to S24.

After the process of S24 to S27 has been carried out on all of the N pieces of background ribbons W in the set, the flow of division in the vertical direction as shown in FIG. 5(a) is used with respect to each of the subsections recorded in S16 (S28).

Using the foregoing way, the block-division section 6 first selects a full image and then divides the image into sections in the vertical direction as shown in FIG. 5(a). The block-division section 6 divides each of the sections in the horizontal direction as shown in FIG. 5(b) and in the vertical direction alternately until each of the sections of the image become uniform. The division in the vertical direction ends when the background ribbons W become uniform in width VWW. The division in the horizontal direction ends when the background ribbons W become uniform in height HWH.

Figure 6:
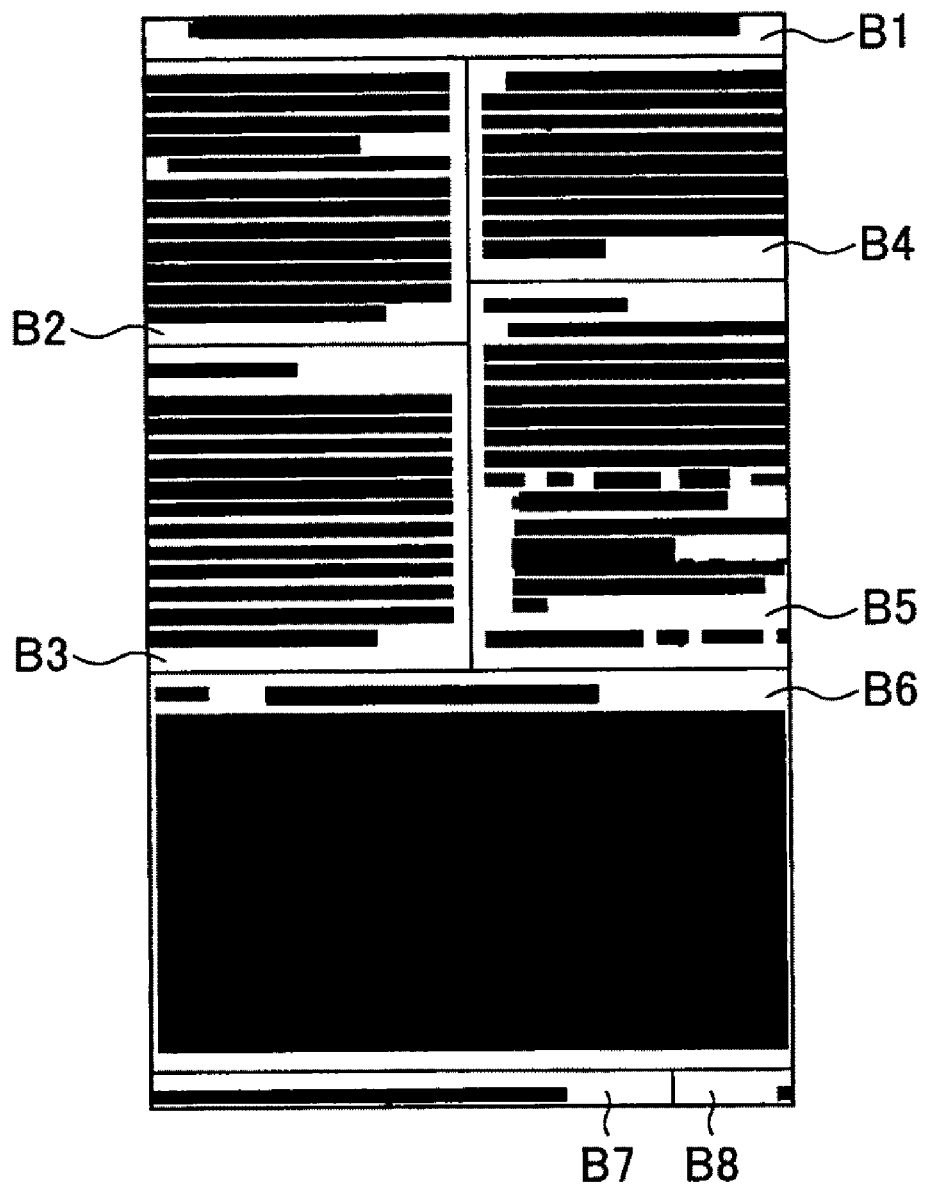
FIG. 6 is an illustration showing a result of division carried out by the block-division section in the image-document retrieving apparatus.

FIG. 6 shows the image divided into blocks. A one-page image is divided into eight blocks B1 to B8, each of which is uniform.

Figure 7:
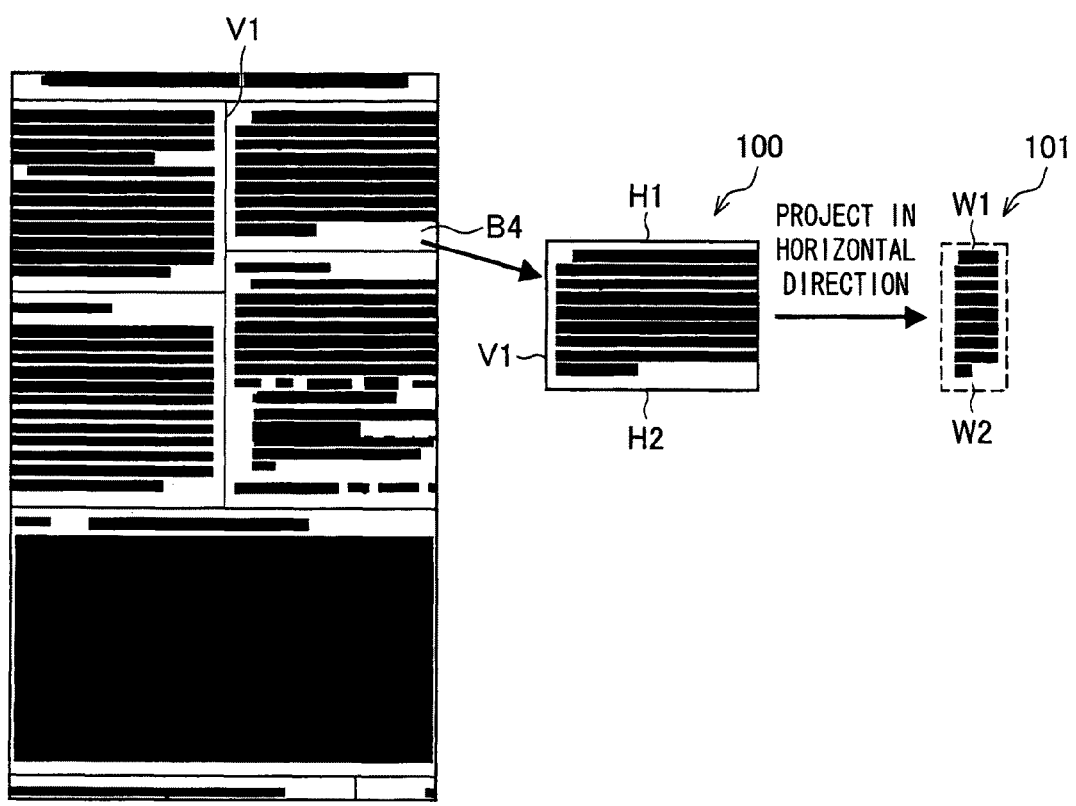
FIG. 7 is an illustration showing a detail of a block after the division shown in FIG. 6.

FIG. 7 shows details of the block B4 shown in FIG. 6. The block B4 is in an area on the right of a vertical division line V1. In the figure, the diagram indicated by reference numeral 100 is an enlarged diagram of the block B4, and the diagram indicated by reference numeral 101 is a projection pattern of the block B4 in the horizontal direction. In the projection pattern 101, the heights HWH of two background ribbons W1 and W2 are both greater than those of the other background ribbons W. Thus, horizontal division lines H1 and H2 are drawn in the background ribbons W1 and W2. In the block B4, the background ribbons W other than the background ribbons W1 and W2 are uniform in height HWH. When this state is reached, the block-division section 6 stops dividing in the horizontal direction.

The way of the division into blocks is not limited to those illustrated in FIGS. 5(a) and 5(b), as long as it is possible to form subsections each having background ribbons W uniform in their width VWW and height HWH.

Dividing into geometric blocks relatively uniform in space between lines of the image document makes it possible to keep the retrieval high in accuracy even if color density or resolution differs, or even if the object to retrieval is an image document containing a combination of different languages.

After having been divided into blocks by the block-division section 9, the filing image and the discrimination image are transmitted to the feature block selecting section 10.

On the basis of the filing image and the discrimination image thus divided into plural blocks, the feature block selecting section 10 selects, in accordance with a certain rule, a predetermined number of feature blocks describing the features of the images.

A block that is greater in visual impact as an image and larger in area is selected as the feature blocks. This way of selecting the feature blocks is considered to relatively match subjective judgment of human being.

Further, not all of the blocks divided by the block-division section are used, but the feature block that describes the features of the page image document is selected by the feature block selecting section 10. This makes it possible to exclude factors that influence the accuracy of the retrieval, such as blocks with a little content, and therefore improve accuracy of the retrieval.

Specifically, the feature block selecting section 10 selects, among the blocks in the page, a block that is not linear and has a larger area. The more the feature blocks are selected, the better the accuracy of retrieval of the target image document becomes. Increase in the number of feature blocks selected causes an increase in time necessary to determine the degree of similarity. In the present embodiment, the feature block selecting section 10 selects four feature blocks. The number of feature blocks to be selected may be arranged so as to be settable to any number.

Figure 8:
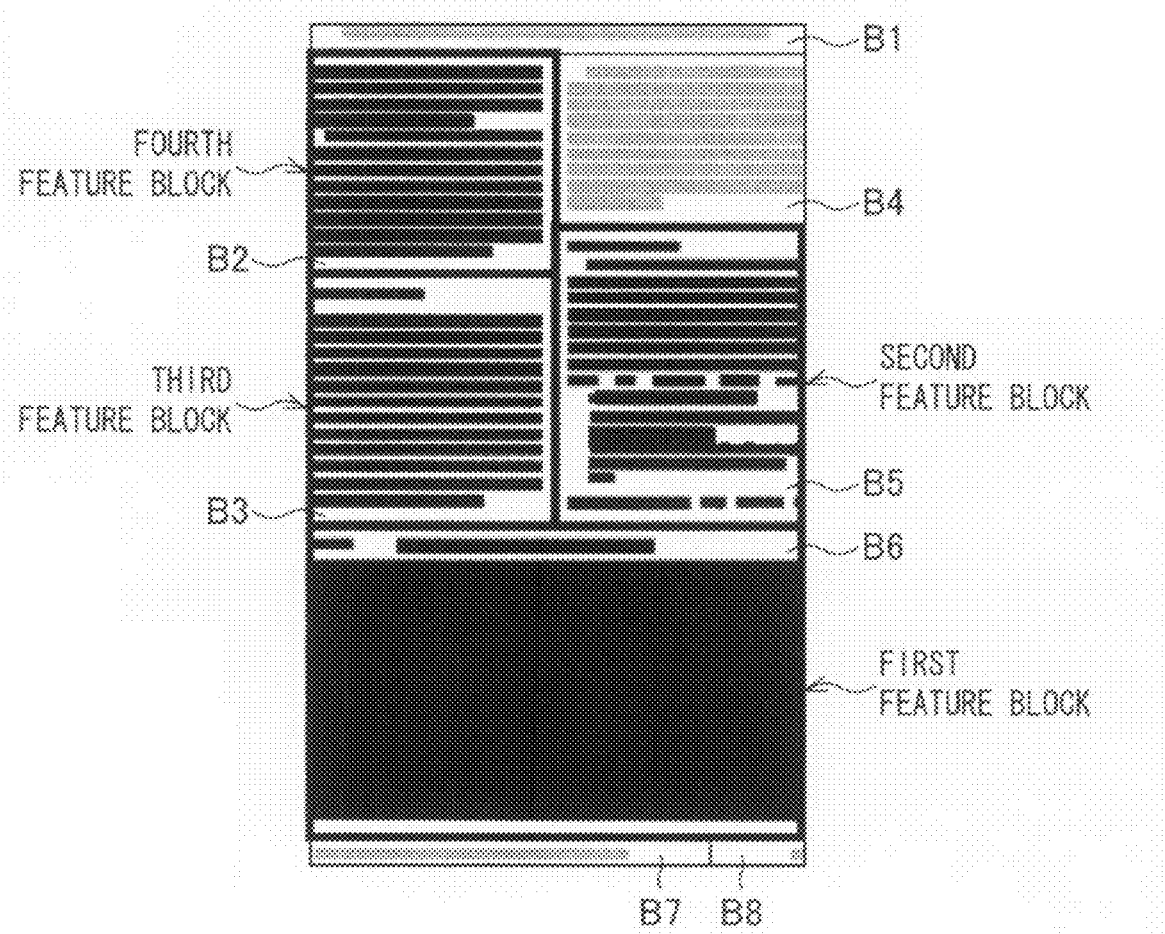
FIG. 8 is an illustration showing a result of selection that the feature block selecting section has carried out on the result of division in FIG. 6 in the image-document retrieving apparatus.

FIG. 8 shows a result of the selection. Four blocks among the eight blocks B1 to B8 of FIG. 6 are selected under the conditions of non-linearity and larger area. In this case, those four blocks B2, B3, B5, and B6 are selected as the feature blocks. The feature blocks thus selected are ranked first to fourth according to their sizes. The block B6, which is the largest, is the first feature block. The block B5, which is the second largest, is the second feature block. The block B3, which is the third largest, is the third feature block. The block B2, which is the fourth largest, is the fourth feature block.

The feature blocks are numbered according to their sizes in the foregoing case, but the blocks may be numbered according to information on positions of the blocks or the like.

After the feature blocks of the filing image and the discrimination image have been selected by the feature block selecting section 10, the filing image and the discrimination are transmitted to the feature calculating section 11.

On the basis of the filing image and the discrimination image, of which the feature blocks have been selected, the feature calculating section 11 determines information on the feature blocks as the features of the images.

The feature calculating section 11 determines the following five values for each of the feature blocks: a position coordinate of the center of each block; a height of each block (distance in the vertical direction); a width of each block (distance in the horizontal direction); a tightness of each block; and a density of each block.

The tightness of the block is a value obtained by dividing a peripheral length of the block by an area of the block. The density of the block is a value obtained by dividing the number of black pixels contained in the block by the area of the block. Note that the number of black pixels is determined not for an input image converted into the rectangular images P but for an image processed by the image preliminary-processing section 2. This makes it possible to reduce the degree of similarity in a case in which actual images differ even if the number of black pixels in the rectangular images P is similar.

On the basis of the five values determined for each of the four feature blocks, the feature calculating section 11 determines five features of the image.

Four out of the five features of the image are constituted of "four elements, namely the height of each block, the width of each block, the value obtained by dividing the peripheral length of each block by the area of the block, and the value obtained by dividing the number of black pixels contained in each block by the area of the block," of the respective four feature blocks.

Specifically, they are information on the first feature block constituted of the four elements, information on the second feature block constituted of the four elements, information on the third feature block constituted of the four elements, and information on the fourth feature block constituted of the four elements.

The fifth feature of the image is information on a rectangular defined by the respective position coordinates of the centers of the feature blocks.

The five features of the image thus determined by the feature calculating section 11 are incorporated into the respective feature vectors of the filing image and the discrimination image by the feature vector creating section 7. The respective feature vectors may certainly be constituted solely of the five features.

The feature vectors thus created are aggregates of main features of the images. This makes it possible to describe more overall content of the image document, so that the retrieval of the image document further improves in accuracy. Further, the feature vectors created by aggregating the information on the respective feature blocks becomes simpler and more intuitive, so that it becomes possible to reduce the amount of calculation, compared with conventional ways of extracting the features.

The feature vector creating section 7 transmits the feature vector created for the filing image to the feature vector database 12, and transmits the feature vector created for the discrimination image to the image discrimination section 13.

The feature vector database 12 accumulates the feature vector of the filing image thus transmitted, in such a way as to associate the feature vector with the filing image accumulated in the image database 15. The feature vector creating section 7 and the feature vector database 12 constitute the feature vector accumulating section 16, which creates the feature vectors of the filing images and accumulates the feature vectors in such a way as to associate the feature vectors with the image database 15.

The image discrimination section 13, when obtaining the feature vector of the discrimination image, refers to the feature vector database 12 to compare the stored feature vectors with the feature vector of the object of discrimination. The image discrimination section 13 discriminates, as a possible target image, an image with a feature vector that is high in the degree of matching. The image discrimination section 13 then extracts the image from the image database 15 and supplies the image to the retrieval result displaying section 14, which is constituted of a display device or the like.

In the present embodiment, the image discrimination section 13 extracts images in descending order according to the degree of matching, and transmits a group of similar images to the retrieval result displaying section 14. The feature vector creating section 7 and the image discrimination section 13 constitute a retrieving section 17, which creates the feature vectors of the discrimination images and retrieves a target image from the image database 15.

The image discrimination section 13 establishes a correspondence between the feature blocks of the discrimination images and the feature blocks of the filing images accumulated in the image database 15. Specifically, the feature blocks of the discrimination image are selected, and a feature block having the highest degree of similarity among the four feature blocks in the feature vector database 12 is searched to create a matrix pair of the feature blocks. Consequently, matrix pairs of the four feature blocks of the two images are created, and the distance between the two images is determined.

Figure 9:
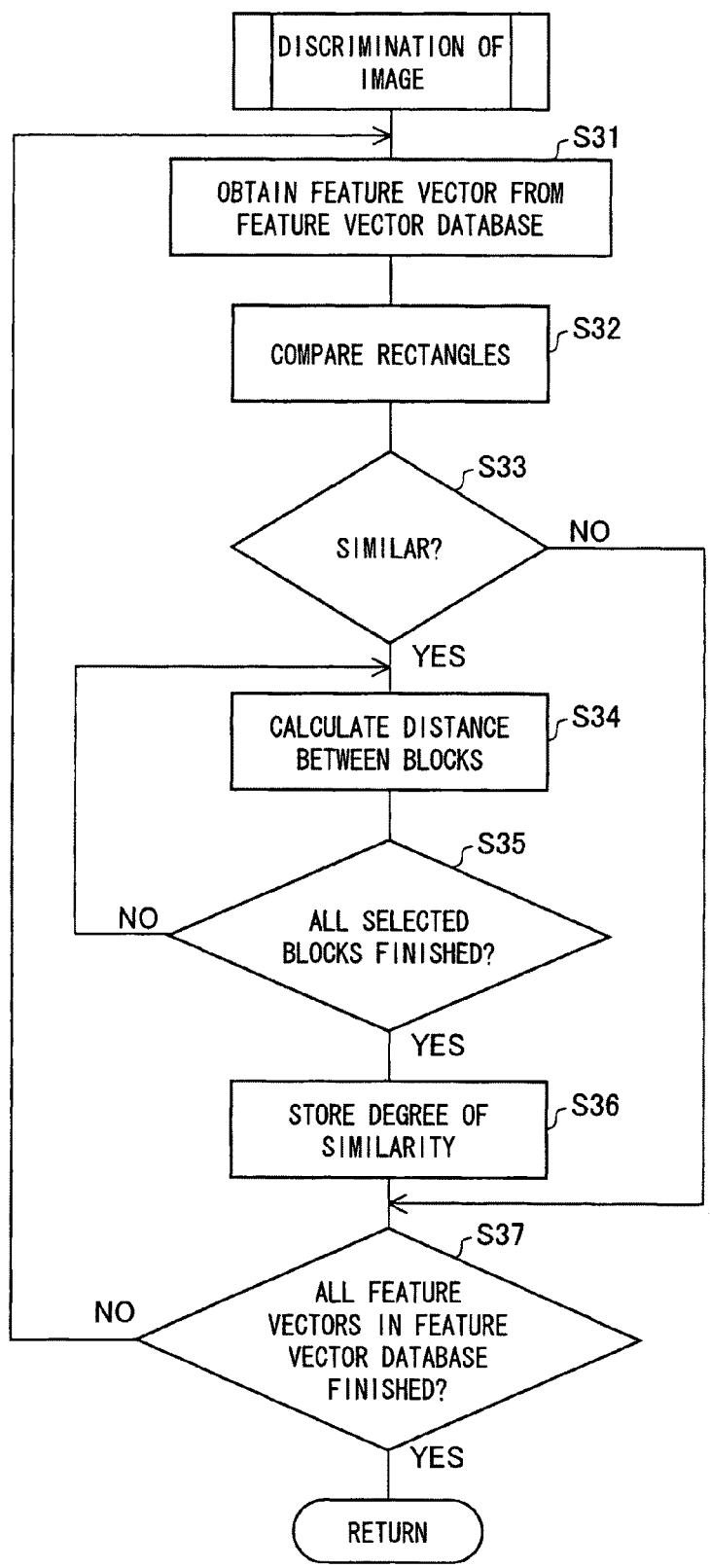
FIG. 9 is a flowchart showing a process carried out by an image discrimination section in the image-document retrieving apparatus.

FIG. 9 shows how the target image is discriminated in the image discrimination section 13. First, one feature vector is obtained from the feature vector database 12 (S31). Then, using the information on rectangles among the five features of the images that are included in the feature vectors, a rectangle 104 in the discrimination image 102 is compared with a rectangle 105 in the filing image 103 stored in the image database 15, as shown in FIG. 10 (S32), to determined whether or not the rectangle 104 and the rectangle 105 are similar (S33). If the rectangles are not similar, then the flow goes to S37.

On the other hand, if the rectangle 104 and the rectangle 105 are similar, then the flow continues to S34 to determine the distance between the blocks of the discrimination image and the image stored in the image database 15, by use of the remaining four features of the images that are included in the feature vectors. This is carried out on each of the four feature blocks to determine the respective distances between the blocks.

The remaining four features of the blocks are "the height of the block (distance in the vertical direction), the width of the block (distance in the horizontal direction), the tightness of the block, and the density of the block" in the respective four feature blocks. The distance between the feature blocks is determined for each of the features. The following is a mathematical formula for calculating the distance between the blocks.

$$\text{Distance} = \sum_{i=1}^{4} (\text{block\_distance}_i) \qquad \text{[Formula 1]}$$

In this formula, "i" represents the $i^{th}$ one of the feature blocks, that is to say the $i^{th}$ feature block. This distance between the feature blocks serves as the degree of similarity.

The following is a more concrete formula for calculating the distance between the blocks for the $i^{th}$ feature block.

block\_distance$_i$=Height\_dist$_i$+Width\_dist$_i$+Tightness\_dist$_i$+Density\_dist$_i$;

where

Height\_dist$_i$=2*(Height$_{(i,input)}$−Height$_{(i,database)}$)/ (Height$_{(i,input)}$+Height$_{(i,database)}$)

Width\_dist$_i$=2*(Width$_{(i,input)}$−Width$_{(i,database)}$)/ (Width$_{(i,input)}$+Width$_{(i,database)}$)

Tightness\_dist$_i$=Tightness$_{(i,input)}$−Tightness$_{(i,database)}$

Density\_dist$_i$=Density$_{(i,input)}$−Density$_{(i,database)}$;   [Formula 2]

In this formula, "(i, input)" represents the value of the $i^{th}$ feature block of the input image that is an object of discrimination, and "(i, database)" represents the value of the $i^{th}$ feature block stored and accumulated in the image database 15.

The distance between the blocks, which is the degree of similarity, is determined for each of the four feature blocks, from the first feature block to the fourth feature block, by use of the formulae above.

As the foregoing describes, the feature blocks are compared in the image discrimination section 13 during the process of comparing the feature vectors to find out whether or not the discrimination image matches the image document that is an object of retrieval. This makes it possible to avoid retrieval errors such as failure of matching due to deviation of information in local areas of the image. Thus, retrieval errors are reduced.

Further, the information on the rectangles formed by connecting the centers of the four feature blocks is included as the fifth feature of the image. S32 and S33 are carried out prior to the comparison of the information on the four feature blocks to find out whether or not the rectangles are similar, whereby the feature vectors accumulated in the feature vector database 12 (that is to say, images stored in the image database) are sorted accurately. This makes it possible to reduce the amount of calculation in the process of comparing the feature vectors to determine the degree of matching. The comparison using the shape formed by connecting the centers is possible by selecting three or more feature blocks. It should be noted that the five features to describe the features of the image in terms of the information on the respective feature blocks are merely preferred examples, and the present invention is not to be limited by the foregoing description.

FIG. 11 shows a flow in the process of creating the feature vectors of the filing images and accumulating the feature vectors in the feature vector database 12 in the image-document retrieving apparatus of the present embodiment.

As described above, first, the image preliminary-processing section 2 shown in FIG. 1 carries out the preliminary process on the filing image supplied. In the preliminary process, first, the binarization processing section 3 binarizes the image (S41). Then, the noise eliminating section 4 eliminates noise (S42). Thereafter, the gradient correcting section 5 corrects the gradient (S43). Then, the edge clearing section 6 clears edges of the image as shown in FIGS. 3(a) to 3(e) in accordance with the flow shown in FIG. 2, as described above (S44).

When the preliminary process ends, the feature vector creating section 3 shown in FIG. 1 creates the feature vectors. First, the rectangular image extracting section 8 combines text areas so that the image becomes constituted of the rectangular images P as shown in FIG. 4 (S45). Then, the block-division section 9 analyzes the geometric structure of one page, and divides the one-page image into a plurality of blocks, as shown in FIG. 6, in accordance with the flow shown in FIGS. 5(a) and 5(b) (S46).

Thereafter, the feature block selecting section 10 selects four feature blocks, as shown in FIG. 8, according to rules of selecting the feature blocks (S47). Once the feature blocks are selected, the feature calculating section 11 determines the five features of the image (S48).

On the basis of the five features of the image that are determined in S48, the feature vector of the one-page filing image is created. The feature vector thus created is then stored in the feature vector database 12 (S49).

FIG. 12 shows a flow in the retrieval process in the image-document retrieving apparatus of the present embodiment that is arranged as described above. In the retrieval process, the feature vector of the discrimination image is created and compared with the feature vector accumulated in the feature vector database 12 to retrieve a target image.

The same process from S41 to S 48 shown in FIG. 12 are carried out on the discrimination image supplied via the image input section 1, whereby the feature vector of the one-page image is created.

In the retrieval process, using the feature vector thus created, the image discrimination section 13 shown in FIG. 1 discriminates the image by referring to the feature vector database 12 and extracts possible target images as described above, in accordance with the flow shown in FIG. 9 (S50).

The retrieval result displaying section 14 displays the possible target images extracted in S50, in descending order according to the degree of similarity (S51).

It is possible to configure the respective blocks of the image-document retrieving apparatus, especially the image preliminary-processing section 2, the feature vector creating section 7, and the image discrimination section 13, with either of hardware logic and software using CPU as discussed below.

Specifically, the image-document retrieving apparatus include CPU (central processing unit), which executes commands of control programs for realizing respective functions, ROM (read only memory) storing the control programs, RAM (random access memory) to store the control programs in executable formats, and a storage unit (recording medium), such as a memory, storing the programs and various data. An object of the present invention is achievable by providing the image-document retrieving apparatus with a computer-readable recording medium that stores program codes (execute form program, intermediate code program, source program) of the control programs of the image-document retrieving apparatus, which control programs are the software for realizing the functions discussed above, and causing the computer (or CPU or MPU) to read and execute the program codes stored in the recording medium.

The following are examples of the recording medium: a tape such as a magnetic tape and a cassette tape; a disk such as an magnetic disk (e.g., floppy (registered trademark) disk, hard disk) and an optical disk (e.g., CD-ROM, MO, MD, DVD, CD-R); a card such as an IC card (including memory card) and an optical card; and a semiconductor memory such as a mask ROM, an EPROM, an EEPROM, and a flash ROM.

Further, the image-document retrieving apparatus may be configured so as to be connectable with communication networks to supply the program codes via the communication networks. The communication networks are not particularly limited. For example, the Internet, intranet, extranet, LAN, ISDN, VAN, CATV communication networks, virtual private networks, telephone line networks, mobile communication networks, or satellite communication networks may be employed. Further, the transmission media that constitute the communication networks are not particularly limited. For example, a wire transmission medium, such as IEEE 1394, USB, power carriers line, cable TV circuits, telephone lines, ADSL circuits, and wireless transmission media, such as infrared rays (e.g., IrDA, remote-controller), Bluetooth (registered trademark), IEEE 802.11, HDR, mobile telephone networks, satellite circuits, or terrestrial digital networks may be employed. The present invention is also realizable in the form of computer data signals that are concretized by electrical transmission of the program codes and embedded in carriers.

As the foregoing describes, an image-document retrieving apparatus of the present invention that retrieves an image document containing mainly text and a graphic is adapted so that the image-document retrieving apparatus includes: a feature vector creating section that creates a feature vector of a page image document; and an image document discrimination section that compares the feature vector, created by the feature vector creating section, of the page image document that is an object of discrimination, with the feature vector, created by the feature vector creating section, of the page image document that is accumulated as an object of retrieval, and extracts, from the page image documents that are objects of retrieval, a page image document that corresponds to the page image document that is the object of discrimination. The feature vector creating section includes: a rectangular image extracting section that combines text areas of the page image document to extract a rectangular image; a block-division section that analyzes, on the basis of information on the rectangular image extracted by the rectangular image extracting section, a geometric structure of a page to divide the page image document into plural blocks; a feature block selecting section that selects, among the plural blocks divided by the block-division section, plural feature blocks that describes a feature of the page image document; and a feature calculating section that determines, as the feature of the page image document, information on the plural feature blocks selected by the feature block selecting section. The feature vector creating section incorporates, as an element into the feature vector of the page image document, a result of determination carried out by the feature calculating section. Note that the page image document is an image document that is read out on a page-by-page basis and is constituted of one page.

With this structure, the color feature (black pixel or white pixel), the spatial-relation feature (distance between adjacent black pixels), and the feature of the target are used comprehensively in the sections such as the rectangular image extracting section and the block-division section. Accordingly, plural types of feature information on the image are used so that it becomes possible to avoid the loss of information on the image resulting from the use of a single feature. Further, the content of the image is described sufficiently so that it becomes possible to effectively improve the accuracy of the image retrieval.

Further, using the method of analyzing the geometric structure of the page to define the feature block that describes the feature of the image document, the block-division section image divides the page image document into geometric blocks each of which is relatively uniform in space between lines of the document, whereby the accuracy of retrieval is kept high even if an image document that differs in color density and resolution or contains a combination of different languages is the subject of retrieval.

Further, not all of the blocks divided by the block-division section are used, but a feature block that describes the feature of the page image document is selected by the feature block selecting section in order to use the feature block to describe the feature of the page image document. This makes it possible to eliminate elements that influence accuracy of the retrieval, such as blocks with little content, and therefore improve accuracy of the retrieval.

The feature calculating section determines, as the feature of the page image document, information on the plural feature blocks thus selected, and incorporates the feature, as an element, into the feature vector of the page image document. Therefore, main features of the image are aggregated into the feature vector of the image document. Thus, it is possible to describe more overall content of the image document. This further improves the accuracy of the retrieval of the image document. Further, the feature vector defined by aggregating the information on the respective feature blocks is simpler and more intuitive than those defined by conventional ways of extracting the features, and allows reduction in amount of calculation.

Further, the information on plural feature blocks is included in the feature vector of the page image document. Thus, the feature blocks are compared with one another during the process in which the image document discrimination section compares the feature vectors to find out if the discrimination image matches the page image document that is subject to retrieval. Thus, it is possible to avoid retrieval errors such as failure of matching due to deviation of information in a local area of the image, and therefore to reduce retrieval errors.

The image-document retrieving apparatus of the present invention may be arranged in such a manner that the feature block selecting section selects, as the feature block, a feature block that is not linear and is large in area. The block that is not linear and is large in area is high in visual impact and relatively matches subjective judgment of human being. Therefore, the block is suitable as the feature block that describes the features of the image.

Further, the image-document retrieving apparatus of the present invention may be arranged in such a manner that: the feature block selecting section selects n (n is an integer that is not less than 3) pieces of feature blocks; the feature calculating section determines, as the feature of the page image document, information on a polygon having n sides (n is an integer that is not less than 3) and having apexes at respective centers of the feature blocks, in addition to information on the n pieces of feature blocks; and the image document discrimination section carries out comparison of the information on the n pieces of feature blocks only with respect to a page image document having a feature vector that is similar in, among the features included in the feature vector, the polygon having n sides.

The polygon having n sides and apexes at the respective centers of the n pieces of feature blocks describe location of the n pieces of feature blocks. Thus, inclusion of those information as one of the features of the image allows image document discrimination section to accurately sort the image documents accumulated as the objects of retrieval, by determining prior to the comparison of the information on the n pieces of feature blocks whether or not the polygon having n sides is similar. Therefore, it becomes possible to reduce the amount of calculation in the process of comparing the feature vectors to find out the degree of matching.

In this case, the feature calculating section may be arranged in such a way as to determine, as the information on the n pieces of feature blocks, the following four features of each of the feature blocks: a height the block; a width of the block; a value obtained by dividing a peripheral length of the block by an area of the block; and a value obtained by dividing a number of black pixels contained in the block by the area of the block. The respective feature blocks are defined with the four features to determine the degree of similarity, whereby the target image is extracted accurately.

Further, the image-document retrieving apparatus of the present invention may be arranged in such a manner that the block-division section divides, on the basis of the information on the rectangular image, the page image document in such a manner that background areas between the rectangular images adjacent in the horizontal direction are relatively uniform in size within one block, and background areas between the rectangular images adjacent in the vertical direction are relatively uniform in size within one block.

This makes it possible to divide the page image document into the geometric blocks each of which is relatively uniform in space between lines of the image document.

Further, the image-document retrieving apparatus of the present invention may be arranged in such a manner that the block-division section alternately carries out the following operations on the basis of the information on the rectangular image: determining a projection pattern in the vertical direction, and drawing a division line vertically in an area where a background area between the rectangular images is dissimilar to other background area in size in the horizontal direction; and determining a projection pattern in the horizontal direction, and drawing the division line horizontally in an area where a background area between the rectangular images is dissimilar to other background area in size in the vertical direction The block-division section carries out the operations until the background areas between the rectangular images become uniform in size, in the horizontal direction and in the vertical direction, in every sections divided by the division lines.

This makes it easy to divide the page document image into the geometric blocks each of which is relatively uniform in space between lines of the image document.

Further, it is preferable that the image-document retrieving apparatus of the present invention further include, before the feature vector creating section, an edge clearing section that clears shadow on a peripheral area from the page image document.

Sometimes shadows appear on peripheral sections of images, especially in the case of duplicate images produced by copying. If the shadows are included in the features of the images, accurate retrieval is less likely to be achieved in the retrieval using the features of the images. Especially in the case in which the retrieving apparatus of the present invention is installed in MFP, copying machines or the like, accurate retrieval is less likely to be achieved if the shadows are included.

Clearing the shadows from the page image document by the edge clearing section enlarges the range of processing so that it becomes possible to apply the retrieving apparatuses of the present invention to MFP, copying machines and the like.

Further, the image-document retrieving apparatus of the present invention may be arranged in such a way manner that the image-document retrieving apparatus further includes: an image document accumulating section that accumulates the page image document; and a feature vector accumulating section that creates, with the feature vector creating section, a feature vector of the page image document that is to be accumulated in the image document accumulating section, and accumulates the feature vector in such a manner that the feature vector is associated with a corresponding page image document accumulated in the image document accumulating section, and the image document discrimination section compares the feature vector of the page image document that is the object of discrimination, with the feature vector accumulated in the feature vector accumulating section, and extracting, from the image document accumulating section, a page image document that corresponds to the page image document that is the object of discrimination.

This allows image document discrimination section to carry out the retrieval on the page image documents accumulated in image document accumulating section, by use of the feature vectors accumulated in the feature vector accumulating section, whereby an image filing system suitable for retrieval of image documents is configured.

The method of retrieving an image document containing mainly text and a graphic in accordance with the present invention includes: a feature-vector creating step of creating a feature vector of a page image document; and an image-document discriminating step of comparing the feature vector, created in the feature-vector creating step, of the page image document that is an object of discrimination, with the feature vector, created in the feature-vector creating step, of the page image document that is accumulated as an object of retrieval, and extracting, from the page image documents that are objects of retrieval, a page image document that corresponds to the page image document that is the object of discrimination. The feature-vector creating step includes: a rectangular image extracting step of combining text areas of the page image document to extract a rectangular image; a block-division step of analyzing, on the basis of information on the rectangular image extracted in the rectangular image extracting step, a geometric structure of a page, and dividing the page image document into plural blocks; a feature-block selecting step of selecting, among the plural blocks divided in the block-division step, plural feature blocks on the basis of a predetermined condition; and a feature-calculating step of determining, as a feature of the page image document, information on the plural feature blocks selected in the feature block selecting step. The feature-vector creating step incorporates, as an element into the feature vector of the page image document, a result of determination carried out in the feature calculating step.

Further, a program to cause a computer to cause the respective sections of the image-document retrieving apparatus of the present invention, and a computer-readable recording medium storing the program are included within the scope of the present invention.

Specifically, the image-document retrieving apparatus may be realized by hardware, or by causing a computer to execute a program. Concretely, the program of the present invention causes a computer to operate as the feature vector creating section, the image document discrimination section, the rectangular image extracting section, the block-division section, the feature block selecting section, the feature calculating section, the image document accumulating section, and the feature vector accumulating section. A recording medium of the present invention stores the program.

When executing the program, the computer operates as the image-document retrieving apparatus. Thus, the same advantageous effects as those produced by the image-document retrieving apparatus are produced.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image-document retrieving apparatus that retrieves an image document containing mainly text and a graphic, the image-document retrieving apparatus comprising:
   a feature vector creating section that creates a feature vector of a page image document; and
   an image document discrimination section that compares the feature vector, created by the feature vector creating section, of the page image document that is an object of discrimination, with the feature vector, created by the feature vector creating section, of the page image document that is accumulated as an object of retrieval, and extracts, from page image documents that are objects of retrieval, a page image document that corresponds to the page image document that is the object of discrimination,
   the feature vector creating section including:
      a rectangular image extracting section that combines text areas of the page image document to extract a plurality of rectangular images;
      a block-division section that analyzes, on the basis of information on the plurality of rectangular images extracted by the rectangular image extracting section, a geometric structure of a page to divide the page image document into plural blocks;
      a feature block selecting section that selects, among the plural blocks, plural feature blocks that describe a feature of the page image document; and
      a feature calculating section that determines, as the feature of the page image document, information on the plural feature blocks selected by the feature block selecting section,
      the feature vector creating section incorporating, as an element into the feature vector of the page image document, a result of determination carried out by the feature calculating section, the feature block selecting section selecting n (n is an integer that is not less than 3) pieces of feature blocks;

the feature calculating section determines, as the feature of the page image document, information on a polygon having n sides (n is an integer that is not less than 3) and having apexes at respective centers of the feature blocks, in addition to information on the n pieces of feature blocks; and the image document discrimination section carries out comparison of the information on the n pieces of feature blocks only with respect to a page image document having a feature vector that is similar in, among the features included in the feature vector, the polygon having n sides.

2. The apparatus of claim 1, wherein the feature block selecting section selects, as the feature block, a feature block that is not linear and is large in area.

3. The apparatus of claim 1, wherein the feature calculating section determines, as the information on the n pieces of feature blocks, the following four features of each of the feature blocks: a height of the block; a width of the block; a value obtained by dividing a peripheral length of the block by an area of the block; and a value obtained by dividing a number of black pixels contained in the block by the area of the block.

4. The apparatus of claim 1, wherein the block-division section alternately carries out the following operations on the basis of the information on the plurality of rectangular images:

determining a projection pattern in the vertical direction, and drawing a division line vertically in an area where a background area between the plurality of rectangular images is dissimilar to other background area in size in the horizontal direction; and determining a projection pattern in the horizontal direction, and drawing a division line horizontally in an area where a background area between the plurality of rectangular images is dissimilar to other background area in size in the vertical direction, the block-division section carrying out the operations until the background areas between the plurality of rectangular images become uniform in size, in the horizontal direction and in the vertical direction, in every section obtained as a result of division by the division lines, so that the block-division section divides, the page image document in such a manner that background areas between adjacent ones of the plurality of rectangular images in the horizontal direction are substantially uniform in size within one block, and background areas between adjacent ones of the plurality of rectangular images in the vertical direction are substantially uniform in size within one block.

5. The apparatus of claim 1, further comprising, before the feature vector creating section, an edge clearing section that clears shadow on a peripheral area from the page image document.

6. The apparatus of claim 1, further comprising:

an image document accumulating section that accumulates the page image document; and a feature vector accumulating section that creates, with the feature vector creating section, a feature vector of the page image document that is to be accumulated in the image document accumulating section, and accumulates the feature vector in such a manner that the feature vector is associated with a corresponding page image document accumulated in the image document accumulating section, the image document discrimination section comparing the feature vector of the page image document that is the object of discrimination, with the feature vector accumulated in the feature vector accumulating section, and extracting, from the image document accumulating section, a page image document that corresponds to the page image document that is the object of discrimination.

7. A non-transitory computer-readable medium storing a program for causing a computer to function as each section of the apparatus of claim 1.

8. A method of retrieving an image document containing mainly text and a graphic, the method comprising:

a feature-vector creating step of creating a feature vector of a page image document; and an image-document discriminating step of comparing the feature vector, created in the feature-vector creating step, of the page image document that is an object of discrimination, with the feature vector, created in the feature-vector creating step, of the page image document that is accumulated as an object of retrieval, and extracting, from the page image documents that are objects of retrieval, a page image document that corresponds to the page image document that is the object of discrimination, the feature-vector creating step including:

a rectangular image extracting step of combining text areas of the page image document to extract a plurality of rectangular images;

a block-division step of analyzing, on the basis of information on the plurality of rectangular images extracted in the rectangular image extracting step, a geometric structure of a page, and dividing the page image document into plural blocks;

a feature-block selecting step of selecting, among the plural blocks divided in the block-division step, plural feature blocks on the basis of a predetermined condition;

a feature-calculating step of determining, as a feature of the page image document, information on the plural feature blocks selected in the feature block selecting step, and a step of incorporating, as an element into the feature vector of the page image document, a result of determination carried out in the feature calculating step, in the feature block selecting step n (n is an integer that is not less than 3) pieces of feature blocks being selected;

in the feature calculating step, information on a polygon having n sides (n is an integer that is not less than 3) and having apexes at respective centers of the feature blocks being determined as the feature of the page image document, in addition to information on the n pieces of feature blocks; and in the image document discrimination step comparison of the information on the n pieces of feature blocks being carried out only with respect to a page image document having a feature vector that is similar in, among the features included in the feature vector, the polygon having n sides.

* * * * *